(12) United States Patent
Ford et al.

(10) Patent No.: US 6,318,364 B1
(45) Date of Patent: Nov. 20, 2001

(54) MODULAR DROP OUT CONTAINER FOR AIRCRAFT OXYGEN MASKS

(75) Inventors: Michael D. Ford, Independence, MO (US); Gary Hannah, Merriam, KS (US); Sebastien A. Ramus, Lawrence, KS (US); Sara G. Weinstein, Overland Park, KS (US)

(73) Assignee: Be Intellectual Property, Inc., Wellington, FL (US)

( * ) Notice: Subject to any disclaimer, the term of this patent is extended or adjusted under 35 U.S.C. 154(b) by 0 days.

(21) Appl. No.: 09/347,716

(22) Filed: Jul. 5, 1999

(51) Int. Cl.⁷ .................................................. A61M 16/00
(52) U.S. Cl. ................................. 128/204.18; 128/204.29
(58) Field of Search ..................... 128/206.27, 207.11, 128/206.26, 204.29, 204.18; 244/118.5, 147; 206/216

(56) References Cited

U.S. PATENT DOCUMENTS

| | | | |
|---|---|---|---|
| 3,379,195 | * | 4/1968 | Bleach ............................... 244/118.5 |
| 3,647,165 | * | 3/1972 | Whitla ............................... 244/118 |
| 3,981,302 | * | 9/1976 | Veit ................................... 244/118.5 |
| 4,023,874 | * | 5/1977 | Jong et al. ........................ 244/118 |
| 4,154,237 | * | 5/1979 | Courter ............................. 244/118.5 |
| 4,475,752 | * | 10/1984 | McKenna ........................ 128/206.27 |
| 4,481,945 | * | 11/1984 | Levine ............................. 128/206.27 |
| 4,609,166 | * | 9/1986 | Brennan ........................... 244/118.5 |
| 4,710,756 | * | 12/1987 | Thornburg et al. .................. 340/628 |
| 4,840,171 | * | 6/1989 | Rohling et al. .................. 128/204.18 |
| 4,862,147 | * | 8/1989 | Thomas ........................... 128/201.23 |
| 4,909,247 | * | 3/1990 | Terrisse et al. ................. 128/206.27 |
| 5,078,343 | * | 1/1992 | Howlett ............................. 244/118.5 |
| 5,154,374 | * | 10/1992 | Beroth .............................. 244/118.5 |
| 5,207,303 | * | 5/1993 | Oswalt et al. ......................... 190/108 |
| 5,803,062 | * | 9/1998 | Aulgur ............................ 128/202.26 |
| 5,816,244 | * | 10/1998 | Aulgur ............................ 128/202.26 |
| 5,823,472 | * | 10/1998 | Luria ................................ 244/118.1 |
| 5,954,052 | * | 9/1999 | McDonald et al. ............. 126/206.27 |
| 6,089,230 | * | 7/2000 | Barker et al. ................... 128/204.29 |

OTHER PUBLICATIONS

Scott Product Brochure re Passenger Oxygen Mask Dispensing Units (9/96).
BE Aerospace Drawing re Automatic Deployment Oxygen Mask Container Assy Dual with Curved Lid.
BE Aerospace Drawing re Automatic Deployment Oxygen Mask Container Single.

* cited by examiner

*Primary Examiner*—John G. Weiss
*Assistant Examiner*—Teena Mitchell
(74) *Attorney, Agent, or Firm*—Hovey, Williams, Timmons & Collins

(57) ABSTRACT

A modular, dropout passenger oxygen mask container (10) is provided which allows the container (10) to be used in a variety of different aircraft mask deployment areas presenting respective openings (20) without container modification. The container (10) includes a box (14) having an openable lid (16) and a universal series of component mounts (36–54) in the walls thereof which allow attachment of physically separate oxygen inlet, lid latch and mask oxygen valve components (72,74,76) at multiple locations within the box (14). The components (72,74,76). A separate cover (18) is attached to the lid (16) and is designed to mate with a specific opening (20); preferably, the cover (18) is affixed to lid (16) by means of Velcro (68,70).

8 Claims, 3 Drawing Sheets

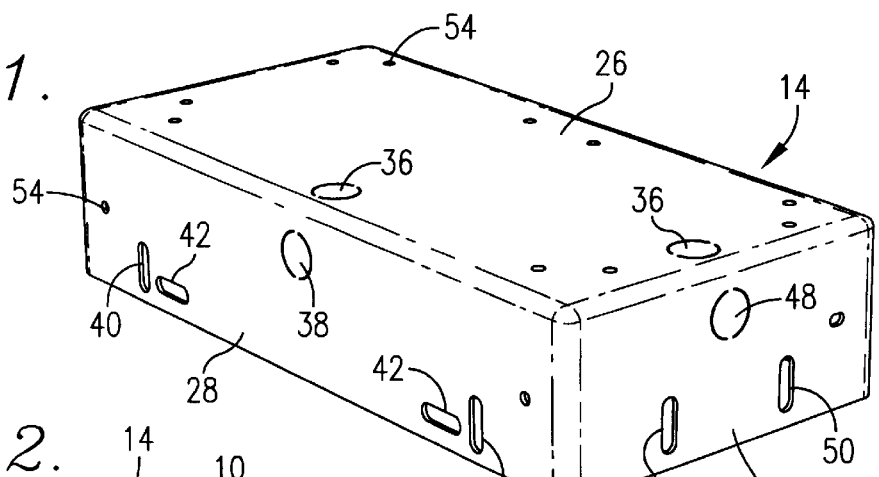
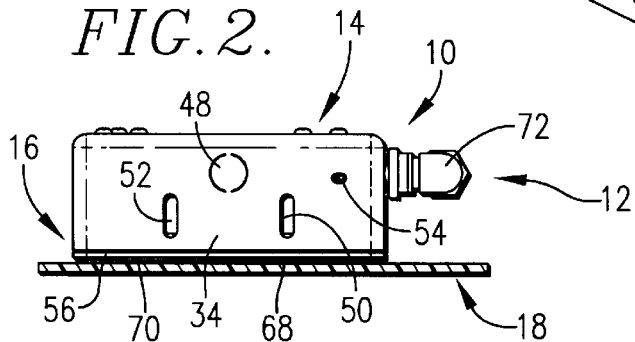
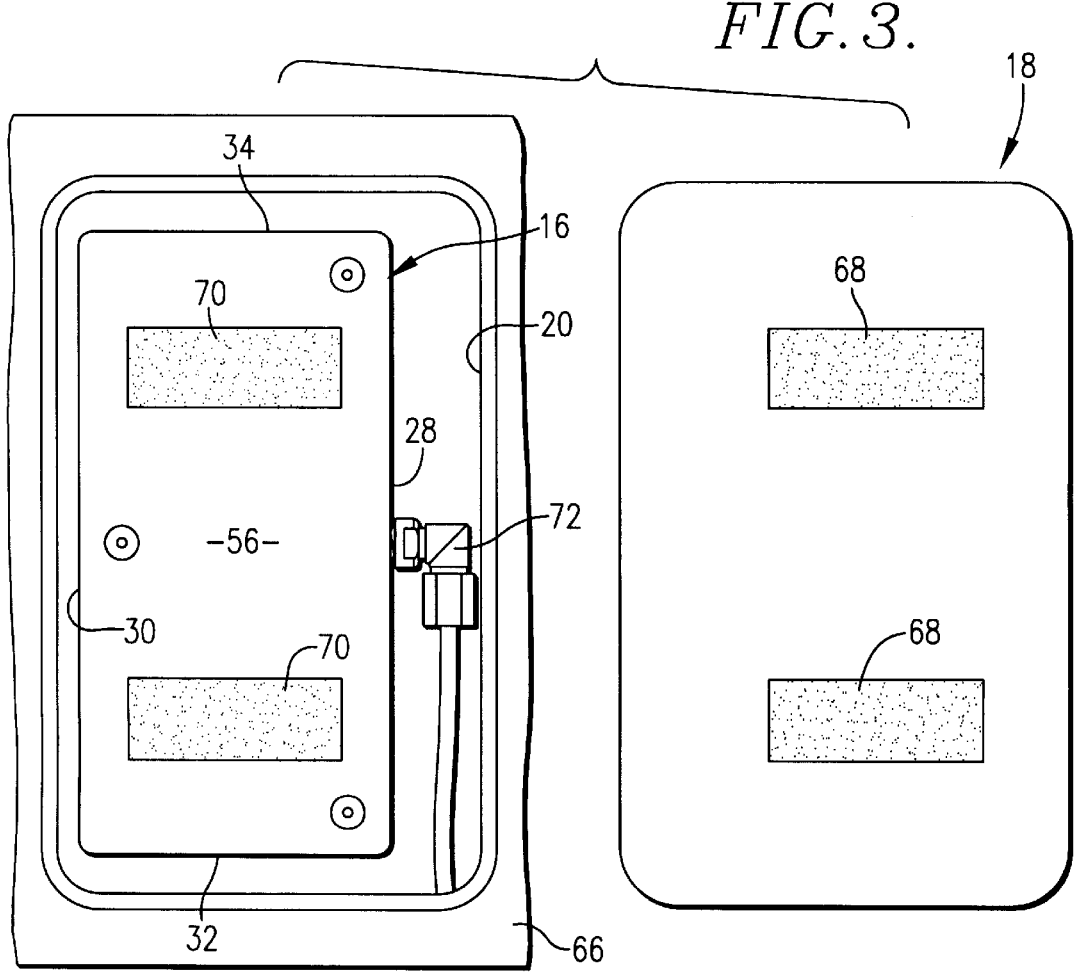

MODULAR DROP OUT CONTAINER FOR AIRCRAFT OXYGEN MASKS

BACKGROUND OF THE INVENTION

1. Field of the Invention

The present invention is broadly concerned with modular oxygen mask deployment containers designed to be mounted within aircraft oxygen mask deployment openings. More particularly, the invention pertains to such modular units having an openable box with physically separate oxygen inlet, oxygen valve and latching components therein which can be attached to the box at various locations affording a considerable degree of design flexibility and eliminating the need to custom design a container for individual aircraft. Also, the preferred containers of the invention are smaller than many standard aircraft openings so that they can be used in a variety of aircraft; in order to close the openings in an aesthetically pleasing manner, the containers have closure covers attached to the lids thereof. In this fashion, the aircraft openings are fully closed while nevertheless permitting use of the small, readily modifiable containers of the invention.

2. Description of the Prior Art

Commercial passenger aircraft are provided with an emergency oxygen mask for each passenger, to be used in the event of a cabin depressurization. Typically, the masks are stored within a deployment opening adjacent the passenger seating, for ready access during emergency situations. In many aircraft the masks are stored in specialized containers situated in deployment openings directly above the passenger seats. In operation, the container lid is opened through a selectively actuatable latch mechanism allowing the stored masks to drop under the influence of gravity for passenger access. In some smaller aircraft the deployment openings may be provided astride passenger seats. In any case, the masks are operatively connected to a source of oxygen, e.g., a central oxygen supply or to respective oxygen-generating candles located adjacent each mask container.

Normally, the oxygen mask containers used in the past have been specifically designed for each individual type of commercial aircraft. Thus, the containers used in a Boeing 757 aircraft may not be readily used in an Airbus. As a consequence of this design strategy, many containers include unique parts which cannot realistically be used in other containers. To give but one example, it is very common to combine the oxygen inlet, lid latch and oxygen valve components in a single device. While this tends to reduce the weight of the container, it renders the part virtually unuseable in other designs. Moreover, a failure in such a combined part complicates trouble shooting and replacement. These combined parts are also relatively large and take up a considerable volume of space within the container which often creates unnecessary "dead spaces."

Another consequence of a uniquely designed oxygen mask container is that it is normally sized to essentially fill an associated aircraft deployment opening, and includes a single lid which is sized to mate with the deployment opening. Accordingly, such a container cannot be used in aircraft having a differently configured mask deployment opening, because either the container will not fit within the opening and/or the single lid will not properly mate with the opening.

There is accordingly a real and unsatisfied need in the art for an improved oxygen mask deployment container of the modular type which can be used in a variety of different aircraft without the need for complete redesign thereof.

SUMMARY OF THE INVENTION

The present invention overcomes the problems outlined above and provides a modular aircraft oxygen mask deployment container including a box sized to fit within any one of a plurality of differently sized aircraft oxygen deployment openings presenting respective, different openings, together with a selectively openable lid normally closing the box. At least one oxygen mask is located within the box and is deployable therefrom when the lid is open. An operating assembly is coupled with the box and the mask(s) therein for supplying oxygen to the latter upon mask deployment.

In preferred forms, an outer cover separate from the lid and configured to mate with and close a particular deployment opening is provided, where the outer cover is releasably connected with the lid of the container box for opening movement therewith. Thus, a relatively small box may be used in a wide variety of different aircraft, and the designer need only ensure that an outer cover for a particular deployment opening is used. In practice, the outer cover is advantageously secured to the box lid by means of VELCRO (multiple hook and loop material), thereby allowing easy cover adjustment during installation.

The functionality of the containers of the invention is enhanced to the use of a box having a plurality of individual, spaced apart component mounts formed in the walls thereof. These mounts can be in the form of knockouts, slots, holds or other openings allowing attachment of components within the box at a variety of locations. Furthermore, contrary to present practice, it has been found that it is desirable to provide physically separate oxygen inlet, oxygen valve and lid latch components making up the operating assembly. These physically separate components are attachable to the housing at any one of a number of the component mount locations, thereby giving the designer a high degree of flexibility to accommodate specific situations and weight requirements. Broadly speaking, at least two of the oxygen inlet, oxygen valve and lid latch components should be physically separate and connected to the box at separate components mounts; as indicated though, in preferred forms all three of these components are physically separate.

BRIEF DESCRIPTION OF THE DRAWINGS

FIG. 1 is a perspective view illustrating a modular box forming a part of an oxygen mask deployment container;

FIG. 2 is a fragmentary view in partial vertical section illustrating a complete modular oxygen mask deployment container mounted within an aircraft oxygen deployment opening;

FIG. 3 is a bottom view of the unit illustrated in FIG. 2, but showing the outer cover in separated relation to the remainder of the unit;

DETAILED DESCRIPTION OF THE PREFERRED EMBODIMENT

Figure 4:
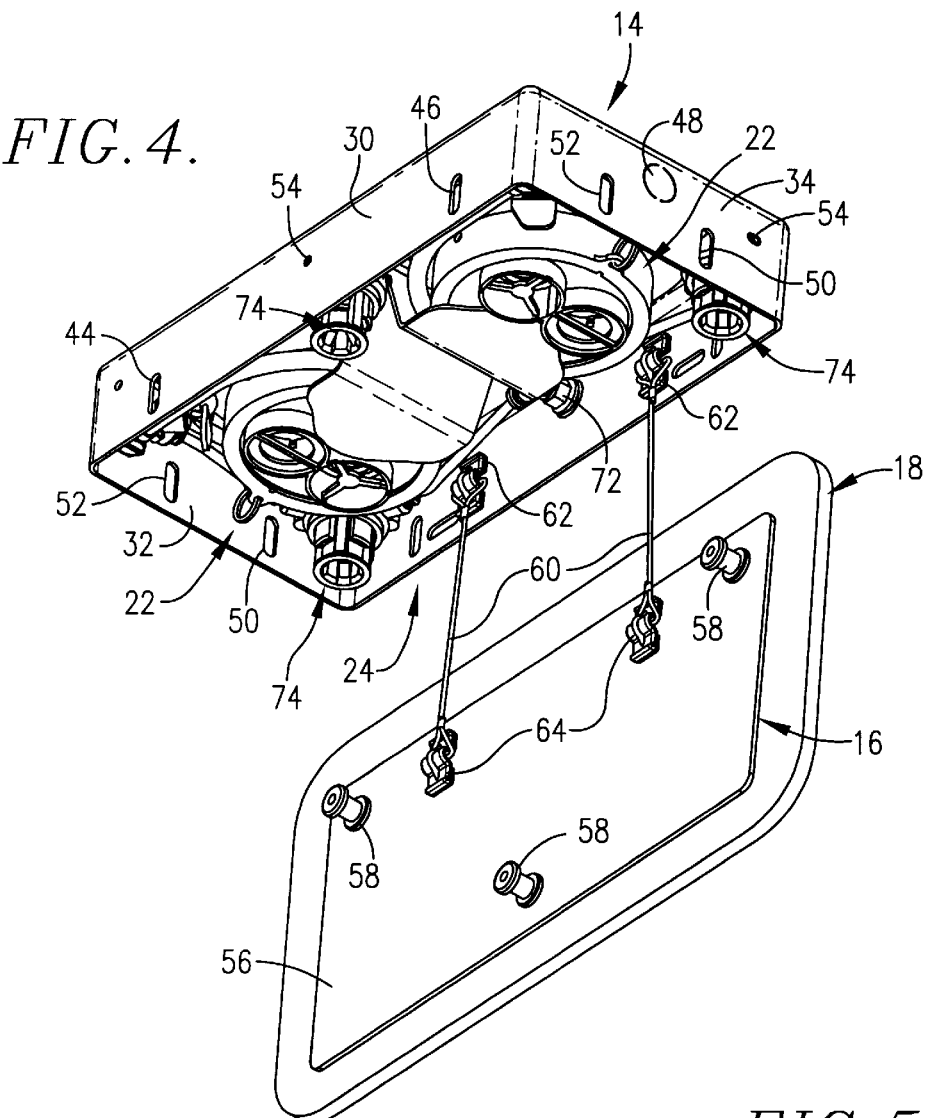
FIG. 4 is a perspective view of the unit shown in FIGS. 2–3, but with the unit lid and outer cover separated to permit deployment of oxygen masks.
Figure 5:
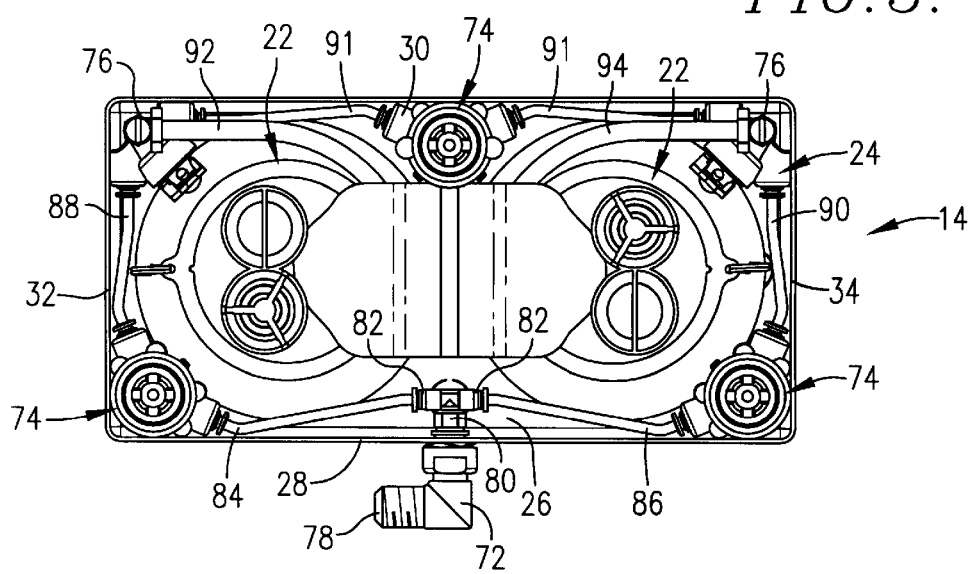
FIG. 5 is a bottom view of the unit illustrated in FIG. 4 with the lid and outer cover removed.

Turning now to the drawings, an emergency modular oxygen mask deployment container 10 is illustrated. The container 10 is mounted within an oxygen deployment area 12 of an aircraft (see FIG. 2), and broadly includes an elongated, rectangular box 14, an openable lid 16 normally closing the box 14 and an outermost cover 18 operatively coupled with the lid 16 and designed to mate with the opening 20 presented by the area 12. The box includes in its interior a pair of stowed oxygen masks 22, as well as an operating assembly broadly referred to by the numeral 24 which is coupled with the masks 22 in order to supply oxygen thereto when the lid 16 and cover 18 are opened and the masks are deployed for use.

In more detail, it will be seen that the box 14 includes top wall 26, side walls 28 and 30 and end walls 32, 34. As shown, each of the box walls 26–34 is provided with a multiplicity of component mounts. Thus, the top wall 26 has a pair of spaced apart circular knockouts 36, while side wall 28 has a circular knockout 38 and two pairs of transverse slots 40, 42. The sidewall 30 is provided with two spaced vertical slots 44, 46. Finally, the end walls 32, 34 each have a central knockout 48 and a pair of spaced vertical slots 50, 52. In addition to these component mounts, each of the walls includes a number of small circular openings 54. These openings 54 allow the installation of internal box components at desired locations.

The lid 16 is in the form of a flat metal plate 56 which is sized to close the open bottom of box 14. The plate 56 carries one or more latch pins 58 which are strategically located relative to the latching components within box 14 as will be explained. In the embodiment of FIGS. 1–4, the lid 16 is connected to the box 14 by means of a pair of flexible lanyards 60 which are secured to the box wall 28 and lid 16 by clips 62, 64 respectively.

The cover 18 is provided primarily for aesthetic purposes and has an exterior surface designed to conform with that of the wall structure 66 of the aircraft cabin surrounding the opening 20. As indicated above, the cover 18 is sized to mate with and close the opening 20. To this end, mating VELCRO (multiple hook and loop material) strips 68, 70 are provided on the lower surface of plate 56 and the upper surface of cover 18 so that the cover is secured to the plate 56 in proper relation to close opening 20.

The masks 22 are themselves entirely conventional and are received within the confines of box 14 until they are deployed. For example, when the container 10 is located in an overhead position above passenger seats (as depicted in the drawings), the masks will fall under the influence of gravity to a convenient use position when the lid 16 and cover 18 are opened.

The operating assembly 24 broadly includes a generally L-shaped nipple-type swivel oxygen inlet 72, one or more lid latching components 74, and a number of oxygen valve components 76 corresponding to the number of masks 22 within the box. In the embodiment depicted in FIGS. 1–4, the inlet 72 is mounted on sidewall 28 at the mount location defined by knockout 38. The three latching components 74 are located in a generally triangular array, with two of the components 74 mounted adjacent the ends of sidewall 28, and the third mounted centrally on the wall 30. The components 74 are secured in place by the use of appropriate fasteners through adjacent wall openings 54. The two valves 76 are corner-mounted adjacent the ends of sidewall 30, and are secured within the box 14 by threaded fasteners passing through openings 54 in box top wall 26.

The inlet 72 is conventional and includes a threaded inlet port 78 exterior of the box 14 and which is designed to accept an oxygen line. As though skilled in the art will appreciate, oxygen may be supplied to inlet 72 from a central source or from an oxygen generating candle mounted adjacent the container 10. The unit 72 also includes a generally T-shaped outlet 80 on the interior of the box 14 which presents a pair of outlet arms 82.

The latching components 74 mate with the latch pins 58 secured to lid 16. As shown, these latches are pneumatically operated and are specifically described in application for U.S. Letters Patent entitled "Latch Mechanism", Ser. No. 09/330,683, filed Jun. 11, 1999; this application is incorporated by reference herein. The components 74 are designed to release the pins 58 when pressurized oxygen is delivered thereto. Thus, the components 74 are within the pneumatic circuit of the container 10.

Specifically, it will be observed that a pair of oxygen lines 84, 86 are respectively coupled to the outlet arms 82 and extend to the corner-mounted pneumatic latch components 74. Oxygen lines 88, 90 extend from the outlets of the components 74 to the valve components 76. Oxygen lines 91 extend from each valve 76 to the center-mounted latching component 74. Finally, elongated coiled oxygen lines 92, 94 extend from the outlet of the valve components to the masks 22. The various oxygen lines forming a part of the pneumatic circuit are preferably formed of semi-rigid nylon and are of the "push-on" variety, allowing ready interconnection and assembly of the container; this also facilitates trouble shooting and part replacement.

In use, when a cabin depressurization or other emergency situation is encountered, oxygen is delivered to inlet 72 whereupon the pressurized oxygen flows to the latching components 74 via lines 84, 86, 88, 90 and 91 so as to simultaneously operate the latching components to release the pins 58. This allows the lid 16 and attached cover 18 to drop downwardly under the influence of gravity, with the lid/cover combination retained by the lanyards 60. In this orientation, the masks 22 will drop out of the box 14 to a convenient position for use. Of course, the oxygen delivered to the inlet 72 is also fed via lines 84, 86, 88, 90 and 92, 94 to the masks 22.

Figure 6:
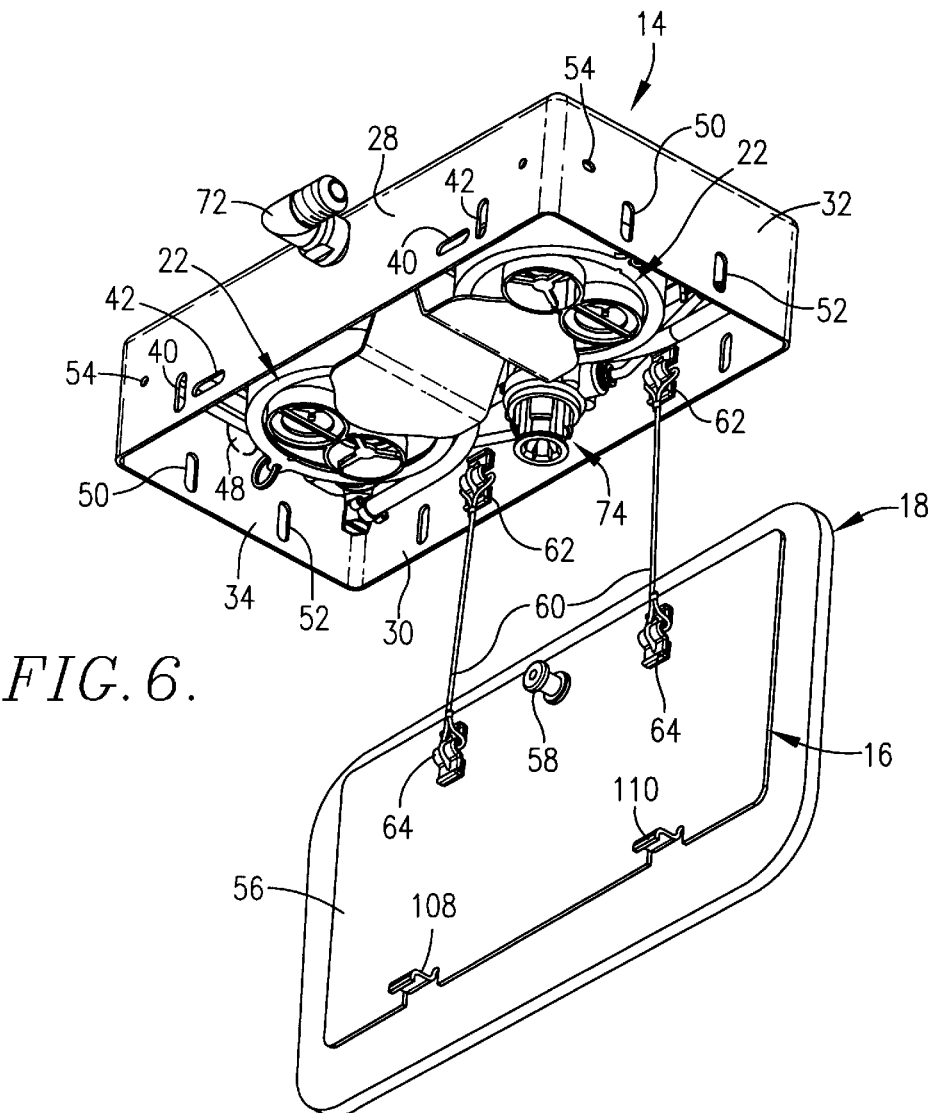
FIG. 6 is a view similar to that of FIG. 4, but illustrating another embodiment in accordance with the invention making use of a single lid latch component.
Figure 7:
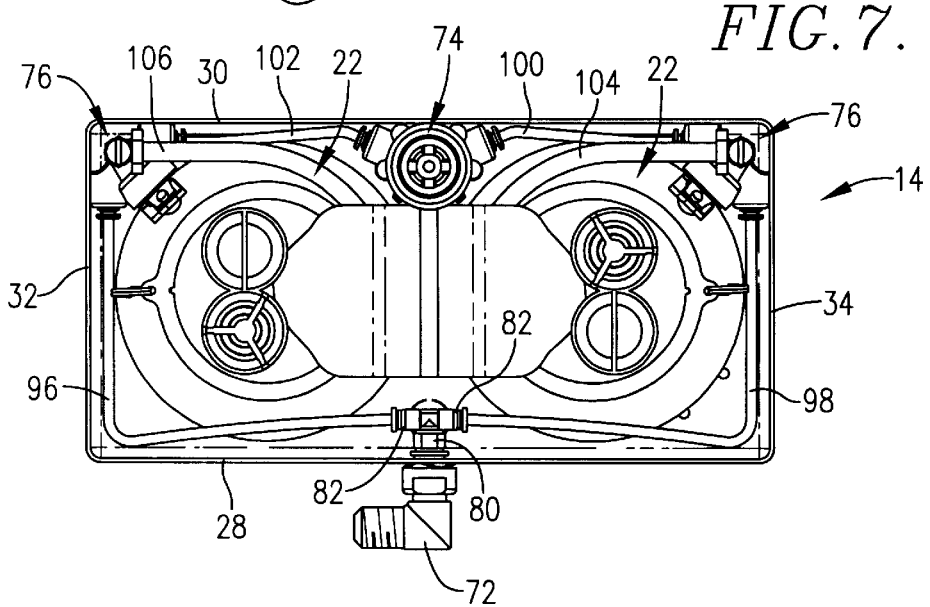
FIG. 7 is a bottom view of the unit depicted in FIG. 6, with the lid and outer cover removed.

The box 14 with its multiple component mounts allows ready modification of the container 10 to accommodate various designs. For example, FIGS. 6–7 illustrate a design making use of only a single lid latching component 74 mounted at the central region of the box 14 adjacent sidewall 30. In this design, a pair of oxygen lines 96, 98 extend from the inlet arms 82 to the corner-mounted valve components 76. Latch-operating oxygen lines 100, 102 extend from the valve components 76 to the central pneumatically operated latch component 74. Coiled oxygen lines 104, 106 also extend from the valve components 76 to the masks 22. Only a single latch pin 58 is employed which is affixed to plate 56 in location for receipt by the central component 74. In order to support the opposed margin of the plate 56, the latter has a pair of spaced, arcuate hinge slips 108, 110 which are configured to be received within the horizontal slots 42 provided in box sidewall 28.

Of course, use of the embodiment of FIGS. 6–7 proceeds in an essentially identical manner as that described previously. Oxygen delivered to the inlet 72 passes to and through the valve components 76 in order to actuate latch component 74, allowing lid 16 and cover 18 to drop downwardly; at the same time, oxygen is delivered to the now-deployed masks 22 via the lines 102, 104.

It will be appreciated that the use of physically separate oxygen inlet, oxygen valve and lid latching components permits a degree of design flexibility in the containers 10 which cannot be duplicated in prior oxygen deployment systems. Thus, these components may be individually located at a number of different sites within the box 14 by making use of the many component mounts provided. To give but one example, the inlet 72 may be affixed as shown to the sidewall 28, but could also be connected to the top wall 26 or either of the end walls. Likewise, the remaining components of the operating assembly 24 may be mounted at various locations at the discretion of the designer.

It will also be appreciated that the containers of the invention may all be connected to a single oxygen source and may be configured in parallel or in series, and in any order. Indeed, the containers could even be attached directly to each other.

We claim:

1. A modular oxygen mask deployment container, comprising:
   a box having walls presenting a plurality of individual, spaced apart component mounts;
   a lid normally closing said box and being selectively openable;
   an oxygen mask within said box and deployable therefrom when said lid is open; and
   an operating assembly operatively coupled to said box and said mask for supplying oxygen to the mask upon said deployment thereof, said assembly having an oxygen inlet component, an oxygen valve component and a lid latch component,
   said oxygen inlet, oxygen valve and lid latch components each being physically separate and connected to said box at separate, individual component mounts,
   said physically separate components being attachable to said box at any one of a number of said component mounts,
   said lid latch component being attached to said lid and selectively detachable to permit said opening of the lid,
   said oxygen inlet and said oxygen valve components attached to each other with said mask attached to said oxygen valve component.

2. The unit of claim 1, said physically separate oxygen inlet, oxygen valve and lid latch components each being attachable to said box at any one of a number of said component mounts.

3. The unit of claim 1, said component mounts comprising apertures formed in said box walls.

4. The unit of claim 1, there being a single lid latch component, said lid being hingedly coupled with said box.

5. The unit of claim 1, there being a plurality of oxygen masks within said box and deployable therefrom when said lid is open, each of said masks operatively coupled with a respective oxygen valve, said oxygen valves operatively coupled with said oxygen inlet component.

6. An oxygen mask deployment container, comprising:
   a box sized to fit within any one of a plurality of differently sized aircraft oxygen deployment openings of respective, different sizes;
   a lid normally closing said box and being selectively openable;
   at least one oxygen mask within said box and deployable therefrom when said lid is open;
   an operating assembly operatively coupled with said box and said at least one mask for supplying oxygen to the mask upon said deployment thereof; and
   an outer cover configured to mate with and close such an opening, said outer cover coupled with said lid for opening movement therewith.

7. The unit of claim 6, there being mating VELCRO hook and loop strips on said outer cover and lid respectively for coupling the lid and outer cover together.

8. A modular oxygen mask deployment container, comprising:
   a box in combination with an aircraft oxygen deployment opening;
   said box sized to fit within one of a plurality of differently sized aircraft oxygen deployment openings of respective, different opening sizes;
   a lid normally closing said box and being selectively openable;
   at least one oxygen mask within said box and deployable therefrom when said lid is open;
   an operating assembly operatively coupled with said box and said at least one mask for supplying oxygen to the mask upon deployment thereof; and
   an outer cover configured to mate and close said aircraft oxygen deployment opening, said outer cover coupled with said lid for movement therewith.

* * * * *